June 1, 1937.                D. B. McRAE                2,082,170
DEVICE FOR FOCUSING ENLARGERS
Filed May 16, 1936
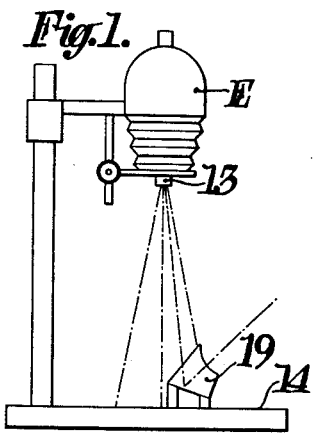
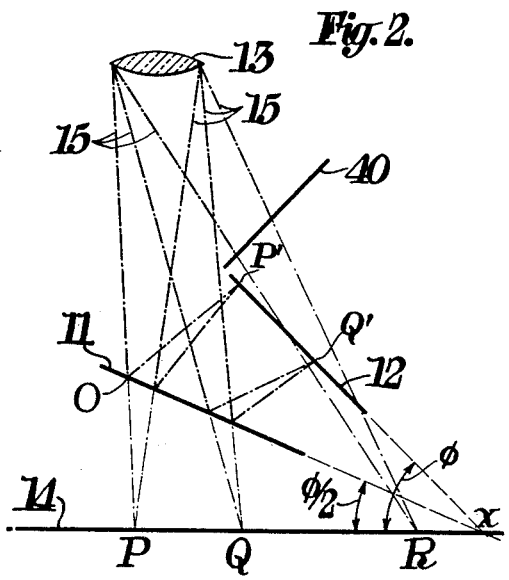
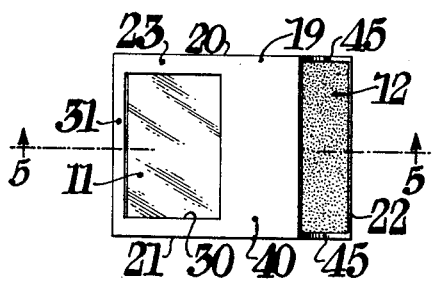
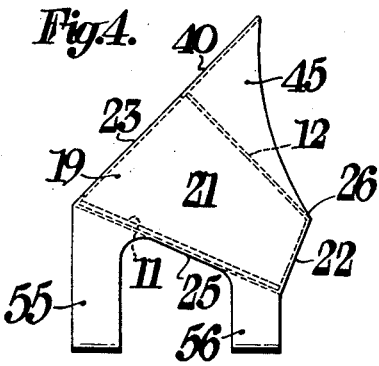
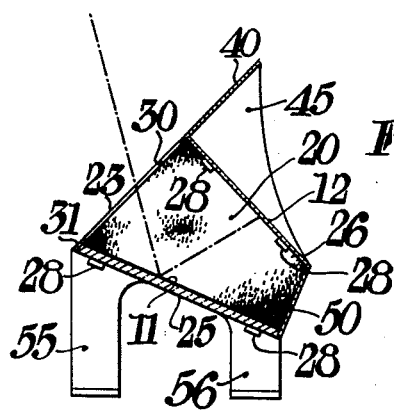
Daniel B. McRae,
INVENTOR
BY
ATTORNEYS.

Patented June 1, 1937

2,082,170

UNITED STATES PATENT OFFICE 2,082,170

DEVICE FOR FOCUSING ENLARGERS

Daniel B. McRae, Rochester, N. Y., assignor to Eastman Kodak Company, Rochester, N. Y., a corporation of New Jersey Application May 16, 1936, Serial No. 80,109

3 Claims. (Cl. 88—24)

The present invention relates to enlargers, and more particularly to a device for properly focusing enlargers of the adjustable type in which the lens is adjusted relative to both the film holders and the sensitized paper easel.

In enlargers of this class, the proper focus is secured by adjusting the lens position until the sharpest image is secured on the paper easel. It is very difficult, however, to secure the exact point of focus merely by examining the entire image projected onto the easel, due to the fact that the light rays upon striking the easel, are scattered and reflected, and also due to the fact that in some negatives the contrast is so slight that clearly defined images are lacking. To overcome this difficulty and to secure a more exact focus, many different focusing methods have been employed. The most exact of these has been the focusing on the magnified silver crystals of the negative. By means of this method, the lens is moved until a clear sharp image of the magnified silver crystals are secured. When this point is reached, the lens is in proper focus.

One object of the invention is to provide a focusing device which does not require repeated adjustments. Another object is to provide such a focusing device which may be placed at any position on the paper easel. A further object is to provide a device of this type which is adapted to facilitate the entire focusing operation. A still further object is to provide a device of the class described which facilitates the examination of a substantially large portion of the same image which is projected onto the paper easel. This large portion permits slight variations in focusing to secure certain definite desired results in the final enlargement. Still another object is to provide an effective and highly successful focusing device which, in addition, is simple in construction and relatively inexpensive to manufacture. An additional object is to provide such a device which focuses by transmitted rather than by reflected light so as to secure the benefit of slight contrasts in the negative.

To these and other ends the invention resides in certain improvements and combinations of parts, all as will be hereinafter more fully described, the novel features being pointed out in the claims at the end of the specification.

In the drawing—

Fig. 1 is an elevation-view of an enlarger showing the application of a focusing device constructed in accordance with the preferred embodiment of the invention.

Fig. 2 is a diagrammatic view, on a larger scale than Fig. 1, showing the application of a focus device constructed in accordance with the present invention.

Fig. 3 is a plan view of the focusing device constructed in accordance with the preferred embodiment of the invention.

Fig. 4 is a side elevation view of the focusing device illustrated in Fig. 3.

Fig. 5 is a vertical sectional view taken substantially on the line 5—5 of Fig. 3 showing the relation of various parts comprising the device.

Similar reference numerals throughout the several views indicate the same parts.

The present invention accomplishes the desirable results, mentioned above, by providing a focusing device which is preferably in the form of a rectangular box adapted to be removably placed on the paper easel. This box is provided with an inclined ground glass screen onto which an image is reflected, and a reflecting mirror disposed below the ground glass screen so that the image to be focused may be viewed by transmitted light.

The mirror is positioned so as to intercept rays of light from the enlarging camera, and to reflect these rays so as to provide an image on the ground glass screen. The distance between the easel and the mirror, and between the mirror and the screen, as well as the angular relations of the mirror and screen are such that the image which appears on the ground glass is a part of the exact image which falls on the paper easel. The size of the mirror and ground glass screen are such that a proper focus can be readily and easily secured with the device on any position of the paper easel.

Referring now to the drawing, there is shown a focusing device constructed in accordance with the preferred embodiment of the invention. This device comprises, in general, a reflecting mirror 11 arranged to receive and to reflect a projected image, and a suitable viewing screen 12 adapted to receive the image reflected by the mirror 11, which image is utilized in focusing the enlarger, all as will be hereinafter more fully described.

Fig. 1 shows, in diagrammatic form, this focusing device used in connection with an enlarger designated broadly as E, the objective lens 13 of which is arranged to project an enlarged image onto a paper easel 14. The mirror 11, which is preferably glass silvered on its upper surface, as shown in Fig. 5, is interposed between the lens 13 and the easel 14 and in position to intercept a part of the image forming light rays 15 extending from the lens 13 to the easel 14. These light rays impinge upon the mirror 11 and are reflected thereby onto the viewing screen 12 which may be of any suitable material adapted to receive a projected image such, for example, as ground glass.

The mirror 11 and the ground glass 12 are preferably so arranged relative to each other and to the easel 14 that distance OP=OP'. Furthermore, the planes of the mirror and ground glass screen are positioned so that extensions of these planes intersect the plane of the easel 14 in a common point X, and form the angles phi/2 and phi respectively with the plane of the easel, as clearly illustrated in Fig. 2. By means of this arrangement, when the lens 13 is adjusted to give a clear sharp image P'Q' on the ground glass screen 12, this adjustment will also produce a clear sharp image PQ on the easel 14 when the focusing device is removed.

The areas of the mirror 11 and the viewing screen 12 are such that a relatively large part of the image is reflected into viewing position on the ground glass screen. To this end, the device may be positioned on any part of the easel 14 to focus on any part of the entire image, and consequently that part of the image which is best suited for focusing can be used. The focusing area is not, therefore, limited to any particular area of the image forming rays.

Any suitable means may be provided for mounting the mirror and ground glass in proper space and angular relation. The present embodiment preferably provides a hollow rectangular box 19 of any suitable material, preferably metal, formed to provide parallel sides 20 and 21, and substantially parallel ends 22 and 23. The sides 20 and 21 engage the edges of the mirror 11 and the ground glass 12, and have the lower and upper edges 25 and 26, respectively, substantially in the planes of these members. The ends 22 and 23 connect the sides 20 and 21, and extend between the planes of the mirror and the ground glass. Due to the divergence of the mirror and screen, the end 23 is slightly longer than the end 22, as clearly illustrated in Fig. 4.

To properly position the mirror and ground glass screen within the box 19, suitable position bosses or lugs 28 are formed on the sides 20 and 21. These lugs are preferably accurately machined so that the mirror and screen are properly and accurately positioned and spaced within the box 19. The mirror and screen are supported by and are preferably cemented or otherwise secured to these lugs 28. The sides and ends of the box 19 engage the sides and end edges respectively of the mirror and the ground glass and thus cooperate with the positioning lugs 28 and the cement to maintain the mirror and ground glass in adjusted position. These side and end walls, as well as the lugs 28, may, therefore, all be broadly considered as positioning means.

In order that light rays 15 may reach the reflecting mirror 11, the end wall 23 of the box 19 is provided with a suitable opening or window 30 through which the light rays may pass. This window is preferably made smaller than the end 23 to provide connecting strips 31 which connect the sides 20 and 21 to maintain the sides in proper spaced relation.

While it is not absolutely essential, it is highly desirable to shield the upper surface of the ground glass 12 from illumination by light rays headed for other parts of the easel such, for example, as shown at R, Fig. 2. To this end, the present invention provides a light resisting shield 40 formed by extending the end 23 upwardly so as to shade the upper surface of the ground glass 12, as clearly illustrated in Figs. 4 and 5. This shield 40 thus prevents any of the rays 15 from falling on this screen 12 except those rays which are reflected by the mirror, 11. If desired the sides 20 and 21 may be extended as to 45 to engage the shield 40.

In addition to shading the upper surface of the ground glass 12, provision is preferably made to avoid stray images caused by light rays falling on the mirror 11 and then reflecting from the inner surfaces of the sides 20 and 21 and then onto the ground glass. This reflection may be avoided by either blackening the inner surfaces of the side walls 20 and 21 between the mirror and the ground glass, or by covering these inner surfaces with a light absorbent material such, for example, as plush as clearly indicated at 50.

The box 19 is maintained in proper spaced and angular relation with the easel 14 by legs 55 and 56 which extend downwardly from the box and into engagement with the easel 14. These legs support the entire box 19 above the easel 14.

The device operates as follows. The box 19 is placed on the paper easel in a position such that some of the light rays 15 fall on the mirror 11. It is entirely immaterial whether these light rays are perpendicular, as a proper focus can be secured with the rays coming at a substantial angle. The rays which fall on the mirror are reflected onto the ground glass screen and form an image thereon which may be viewed by transmitted light forming a bright, easily focused image. The lens 13 is then adjusted to give a sharp image P'Q' on the ground glass screen, and when so adjusted will also give a sharp image PQ on the easel when the focusing device is removed.

It is apparent from the above description that when focusing with the device embodied in the present invention, all that need be done is to place the box on any part of the easel and view the image on the glass screen. In making enlargings, it is often desirable to throw the enlarger slightly out of focus to "soften" the enlargement. The use of the large viewing image on the glass screen enables the enlarger to be thrown out just the proper amount to secure the desired degree of "softness".

While one embodiment of the invention has been disclosed, it is understood that the inventive idea may be carried out in a number of ways. This application is, therefore, not to be limited to the precise details described, but is intended to cover all variations and modifications thereof falling within the spirit of the invention and the scope of the appended claims.

I claim:

1. A device for focusing enlargers adapted to be placed on a paper easel, comprising in combination, an inclined mirror adapted to reflect a portion of an image projected toward said easel, a ground glass viewing screen arranged at an acute angle to said easel and adapted to receive said projected image, the plane of said mirror bisecting the angle formed by said easel and the plane of said screen, a box-like supporting member for said screen and said mirror, said member having a plurality of sides, positioning lugs on certain of said sides arranged to engage and position said mirror and said screen, and means including a shield formed from one of said sides and arranged to overlie the upper surface of said screen to avoid stray images thereon.

2. A device for focusing enlargers adapted to be placed on a paper easel, comprising in combination, a box-like member supported on said easel, said member having a plurality of sides, an inclined mirror positioned within said member and supported in elevated position above said easel by certain of said sides, one of said sides having an opening formed therein to enable light rays projected toward said easel to fall on said mirror, an inclined ground glass viewing screen supported by said certain sides, said screen being inclined at an acute angle to said easel, the plane of said mirror bisecting the angle formed by said easel and the plane of said screen, and a light shield integral with said sides and extending above the plane of said screen to avoid stray images thereon.

3. A device for focusing enlargers adapted to be placed on a paper easel, comprising in combination, a box-like member supported on said easel, said member being formed with opposite side walls, a front and a back wall, an inclined mirror positioned within said member and supported in elevated position above said easel by certain of said walls, said front wall being formed with an inclined portion having an opening therein to permit light rays projected toward said easel to fall on said mirror, an inclined viewing screen supported by said walls and overlying said mirror, said screen being inclined at an acute angle to said easel, the plane of said mirror bisecting the angle formed by said easel and the plane of said screen, a light shield integral with said front wall and extending above the plane of said screen to avoid stray images thereon, and supporting members formed from said side walls and engaging said shield to support the latter and to cooperate therewith in preventing stray light rays from falling on the upper surface of said screen.

DANIEL B. McRAE.